US012592794B2

(12) United States Patent
Dudda et al.

(10) Patent No.: US 12,592,794 B2
(45) Date of Patent: Mar. 31, 2026

(54) LOGICAL CHANNEL PRIORITIZATION IN UNLICENSED SPECTRUM

(71) Applicant: Telefonaktiebolaget LM Ericsson (PUBL), Stockholm (SE)

(72) Inventors: Torsten Dudda, Wassenberg (DE); Zhenhua Zou, Solna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 318 days.

(21) Appl. No.: 18/260,966

(22) PCT Filed: Jan. 11, 2022

(86) PCT No.: PCT/EP2022/050435

§ 371 (c)(1),
(2) Date: Jul. 11, 2023

(87) PCT Pub. No.: WO2022/152692

PCT Pub. Date: Jul. 21, 2022

(65) Prior Publication Data

US 2024/0063953 A1     Feb. 22, 2024

Related U.S. Application Data

(60) Provisional application No. 63/136,676, filed on Jan. 13, 2021.

(51) Int. Cl.
H04L 1/1867     (2023.01)
H04L 1/1812     (2023.01)
H04L 1/1829     (2023.01)

(52) U.S. Cl.
CPC .......... H04L 1/1812 (2013.01); H04L 1/1854 (2013.01); H04L 1/1864 (2013.01); H04L 1/1887 (2013.01); H04L 1/1861 (2013.01)

(58) Field of Classification Search
CPC ... H04L 1/1812; H04L 1/1854; H04L 1/1864; H04L 1/1887; H04L 1/1861; H04L 1/1822
See application file for complete search history.

(56) References Cited

U.S. PATENT DOCUMENTS

2020/0154469 A1* 5/2020 Chin ..................... H04L 1/1822
2020/0322980 A1* 10/2020 Fakoorian ............. H04W 76/11
(Continued)

OTHER PUBLICATIONS

3GPP TSG-RAN WG2 Meeting #110 electronic; Online, Jun. 1-Jun. 12, 2020; Agenda item: 6.7.3; Source: Samsung; Title: Report of [AT110e] [055] [IIOT] MAC: Part 1B (R2-2006243).
(Continued)

*Primary Examiner* — Edan Orgad
*Assistant Examiner* — Malick A Sohrab
(74) *Attorney, Agent, or Firm* — Baker Botts L.L.P.

(57)     ABSTRACT

A wireless device is configured with a first configured grant associated with a first hybrid automatic repeat request (HARQ) pool and a second configured grant associated with a second HARQ pool. The first HARQ pool at least partially overlaps with the second HARQ pool, and the second configured grant partially overlaps with the first configured grant. For the first configured grant, the wireless device selects a first HARQ process from the first HARQ pool. For the second configured grant, the wireless device selects a second HARQ process from the second HARQ pool. The first HARQ process selected for the first configured grant is different than the second HARQ process selected for the second configured grant. The wireless device performs uplink transmission or retransmission for the first configured grant or the second configured grant.

10 Claims, 12 Drawing Sheets

(56) References Cited

U.S. PATENT DOCUMENTS

| | | | | |
|---|---|---|---|---|
| 2021/0250983 A1* | 8/2021 | Kunt | | H04W 72/23 |
| 2022/0248455 A1* | 8/2022 | Fakoorian | | H04L 1/1883 |
| 2022/0294572 A1* | 9/2022 | Wu | | H04L 1/1887 |
| 2022/0369370 A1* | 11/2022 | Loehr | | H04W 74/0808 |
| 2023/0189252 A1* | 6/2023 | Lee | | H04W 72/1263 |
| | | | | 370/329 |
| 2024/0014951 A1* | 1/2024 | Loehr | | H04L 5/0064 |

OTHER PUBLICATIONS

3GPP RAN WG2 Meeting #112-e; Nov. 2-12, 2020; Agenda Item: 8.5.3; Source: InterDigital; Title: IIoT operation in unlicensed controlled environments (R2-2010110).

PCT Notification of Transmittal of the International Search Report and Teh Written Opinion of the International Searching Authority, or the Declaration issued for International application No. PCT/EP2022/050435—Apr. 8, 2022.

* cited by examiner

50

N_11 N_12

N_21 N_22

LOGICAL CHANNEL PRIORITIZATION IN UNLICENSED SPECTRUM

PRIORITY

This nonprovisional application is a U.S. National Stage Filing under 35 U.S.C. § 371 of International Patent Application Serial No. PCT/EP2022/050435 filed Jan. 11, 2022 and entitled "LOGICAL CHANNEL PRIORITIZATION IN UNLICENSED SPECTRUM" which claims priority to U.S. Provisional Patent Application No. 63/136,676 filed Jan. 13, 2021, both of which are hereby incorporated by reference in their entirety.

TECHNICAL FIELD

The present disclosure relates, in general, to wireless communications and, more particularly, systems and methods for logical channel prioritization in unlicensed spectrum.

BACKGROUND

Third Generation Partnership Project (3GPP) new radio (NR) includes ultra-reliable low latency communication (URLLC). Enhancements for URLLC and Industrial Internet of things (IIoT) were introduced in NR Release 16 (Rel-16). At the same time, NR was enhanced to operate in unlicensed/shared spectrum. Ongoing 3GPP discussions include harmonizing the operation of URLLC in unlicensed spectrum.

Uplink (UL) traffic can be scheduled with dynamic UL grants or configured UL grants. For dynamic grants, the gNB provides an UL grant to the user equipment (UE) for each UL transmission. Configured grants are pre-allocated, i.e., provided once to the UE. Thereafter, the configured UL grant is valid for UL transmissions according to a configured periodicity. The UE does not need to transmit padding on the UL resources if no UL data is available for transmission. Thus, the UE may skip an UL transmission on such grants. Multiple parallel configured grant configurations (e.g., with different periodicity/allocation sizes) can be configured for the UE. Each configured grant configuration can be configured with nrofHARQ-Processes and harq-ProcID-Offset so that the UE can select a HARQ process ID within [harq-procID-offset, . . . , (harq-procID-offset+nrofHARQ-Processes−1).

A typical NR-Internet of Things (NR-IIoT) device may handle communication for multiple service types such as, for example, multiple periodic URLLC type robot control messages (also referred to as time sensitive network (TSN)-like traffic), URLLC type of occasional alarm signals (for which periodic resources would need to be configured or relying on UE to send scheduling request for each occasional alarm message), occasional sensor data transmission (can be time-critical or non-time-critical), other mobile broadband (Enhanced Mobile Broad Band (eMBB)/Mobile Broadband (MBB)) best-effort type traffic such as occasional video transmissions or software updates. This may lead to a traffic mix to be multiplexed by the UE for UL transmissions, i.e., on medium access control (MAC) multiple logical channels with different priorities would need to be configured. In such a traffic mix scenario, it is crucial to treat URLLC-type of traffic with high priority, while still maintaining a high efficiency/capacity to also serve other traffic types. Traffic of different logical channels (LCHs) can be mapped to different configured grant configurations.

Rel-16 includes intra-UE multiplexing/prioritization (lch-basedPrioritization). For UL, when multiple UL grants overlap (e.g., a configured grant and dynamic grant or multiple configured grants), the MAC layer performs logical channel (LCH) and grants prioritization, where the general intention is that the grant on which the highest priority data allowed/transmitted is chosen. Data to be transmitted on the de-prioritized grant is to be transmitted at the next configured grant occasion, which is referred to as autonomousTx.

For unlicensed spectrum access, a separate mechanism for autonomous retransmissions on configured grants was introduced. A hybrid automatic repeat request (HARQ) process, for which an initial transmission could not take place because of listen before talk (LBT) failure, is considered a pending HARQ process. At each transmission on a HARQ process using a configured grant, the UE shall start a CG Retransmission Timer (CGRT) and if the reception of the HARQ process was not positively acknowledged at the expiry of the timer, the HARQ process is autonomously retransmitted. Whenever there is a pending HARQ process, it is similarly autonomously retransmitted at the next configured grant occasion. The UE chooses the next HARQ process for transmission itself, and it is mandated that the UE should prioritize retransmissions before transmissions of new data.

There currently exist certain challenges. For example, it is unclear how the UE is to prioritize between retransmission and transmission HARQ processes when they are shared between different configured grant configurations and how to apply logical channel prioritization.

SUMMARY

Certain aspects of the present disclosure and their embodiments may provide solutions to these or other challenges. Certain embodiments include a method for the UE to efficiently prioritize data transmissions of different logical channel priority, when such transmissions are based on different configured grant configurations. Certain embodiments also relate to autonomous retransmissions resulting from LBT failures when operating in unlicensed spectrum.

According to certain embodiments, a method is provided by a wireless device that is configured with a first configured grant associated with a first HARQ pool and a second configured grant associated with a second HARQ pool. The first HARQ pool at least partially overlaps with the second HARQ pool, and the second configured grant partially overlaps with the first configured grant. According to the method, the wireless device selects a first HARQ process from the first HARQ pool for the first configured grant. For the second configured grant, the wireless device selects a second HARQ process from the second HARQ pool. The first HARQ process that is selected for the first configured grant is different than the second HARQ process selected for the second configured grant. The wireless device then performs UL transmission or retransmission for the first configured grant or the second configured grant.

According to certain embodiments, a wireless device is configured with a first configured grant associated with a first HARQ pool and a second configured grant associated with a second HARQ pool. The first HARQ pool at least partially overlaps with the second HARQ pool, and the second configured grant partially overlaps with the first configured grant. The wireless device adapted to select a first HARQ process from the first HARQ pool for the first configured grant and a second HARQ process from the second HARQ pool for the second configured grant. The first HARQ process selected for the first configured grant is different than the second HARQ process selected for the second configured grant. The wireless device is adapted to perform UL transmission or retransmission for the first configured grant or the second configured grant.

Certain embodiments may provide one or more of the following technical advantages. For example, particular embodiments fulfill URLLC requirements while at the same time providing high capacity when multiplexing with lower priority services such as MBB.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
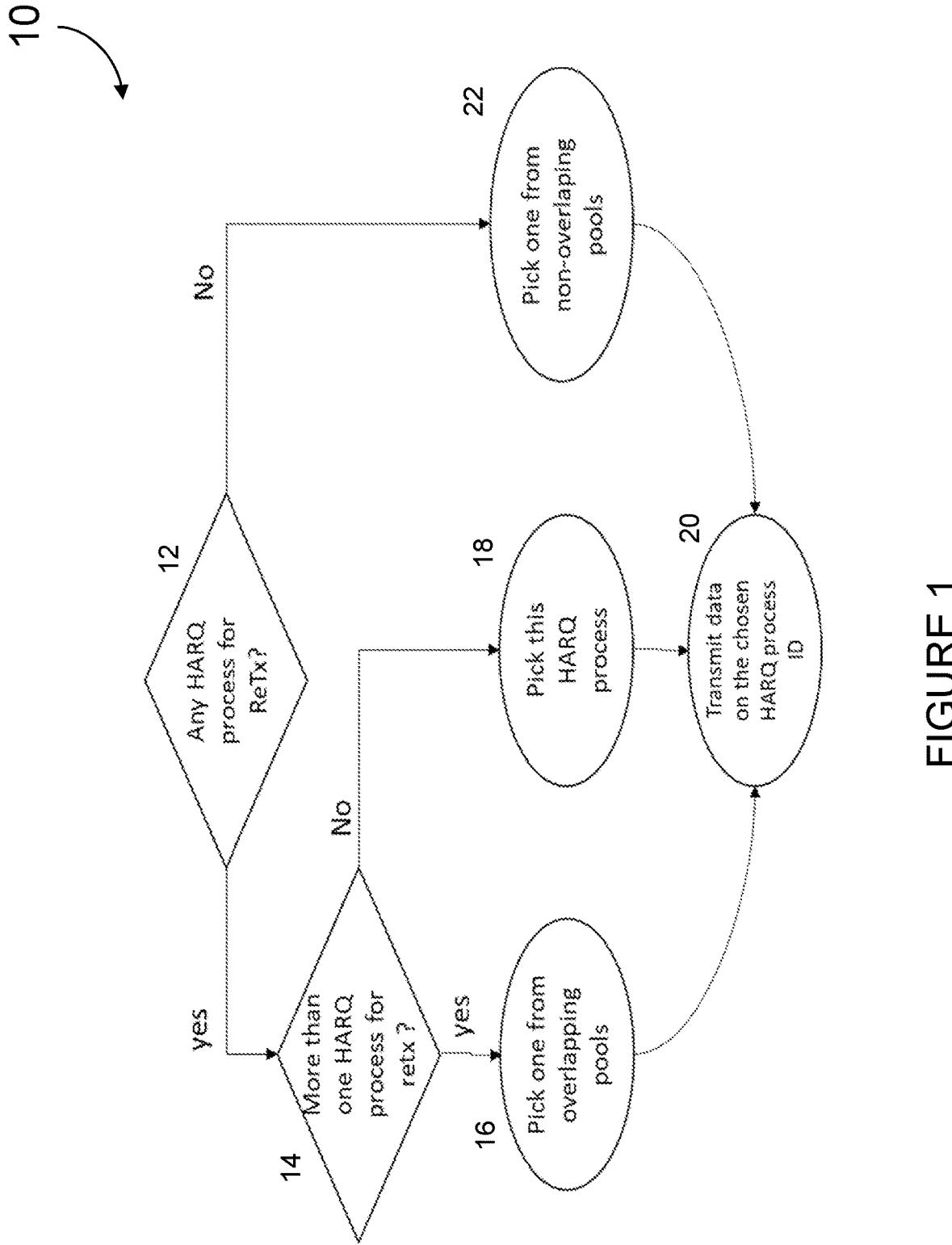
FIG. 1 illustrates an example method demonstrating how a UE chooses a HARQ process ID to transmit, according to certain embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Although particular problems and solutions may be described using NR terminology, it should be understood that the same solutions apply to LTE and other wireless networks as well, where applicable.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the terms "operating in unlicensed spectrum" and "operating in shared spectrum" are used interchangeably. Also, it is assumed that the cg-Retransmission-Timer is configured to support the operation in shared spectrum. For the embodiments described herein, for each configured grant configuration, retransmission is prioritized over initial transmission.

As used herein, the terms "HARQ process" and "HARQ process ID" are used interchangeably.

Considering a configuration where a pool of HARQ processes is shared among multiple configured grant configurations (which is a baseline agreement in ongoing 3GPP discussions), a E) may handle prioritization of transmissions as discussed below. The current MAC specification specifies that the UE implementation can select a HARQ process ID for transmission and retransmission is prioritized over initial transmission:

For configured UL grants configured with cg-RetransmissionTimer, the UE implementation selects an HARQ Process ID among the HARQ process IDs available for the configured grant configuration. The UE shall prioritize retransmissions before initial transmissions.

A problem may arise if the same HARQ process is chosen for two overlapping configured grants, because the UE implementation can select the HARQ Process ID on its own.

In some embodiments, the UE implementation avoids selecting the same HARQ process ID for overlapping configured grants. The UE chooses different HARQ processes for the overlapping configured grants, whenever possible.

According to certain embodiments, a method provided to enable the UE to efficiently prioritize data transmissions with different logical channel priorities when such transmissions are based on different configured grant configurations. Certain embodiments also relate to autonomous retransmissions resulting from LBT failures when operating in unlicensed spectrum.

For example, in particular embodiments, when prioritizing transmissions on overlapping configured grant resources for which HARQ processes are shared, the UE does not select the same HARQ process for overlapping configured grants. When there is only one shared HARQ process for retransmission in one configured grant, instead of choosing to use the HARQ process for new transmission in the overlapping configured grant, retransmission is prioritized over the new transmission. As a result, LCH-based prioritization is never applied for the same HARQ process.

In some embodiments, the UE prioritizes among retransmission and transmissions according to the LCH priority of the data. This applies for shared HARQ processes when all are used for ongoing retransmissions. When all HARQ processes are in use for retransmission, then some embodiments include flushing a HARQ process with lower priority retransmission data and using it for a new transmission of higher priority data. The step of HARQ flushing includes stopping the corresponding configured grant timer and configured grant retransmission timer so that the HARQ transmission is handled as a regular new transmission.

In one example, among the HARQ process identifiers (IDs) for initial transmissions, the UE prioritizes the non-overlapping HARQ process ID pools. On the other hand, among the HARQ process IDs for retransmissions, the UE prioritizes the overlapping HARQ process ID pools (if it can be chosen). The principle is that the UE avoids choosing the HARQ processes for a configured grant that might be chosen by another configured grant. If there is a HARQ process in this overlapping range that requires a retransmission, this should be picked first so that the data is transmitted and the HARQ process can be re-used again. If there is no such HARQ process for retransmission, the UE should choose a HARQ process ID from the non-overlapping pool.

FIG. 1 illustrates an example method 10 demonstrating how a UE chooses a HARQ process ID to transmit, according to certain embodiments. At step 12, the UE determines whether there is any HARQ process for retransmission. If so, the UE then determines at step 14 whether there is more than one HARQ process for retransmission. If there is more than one HARQ process for retransmission, the UE picks one HARQ process from overlapping pools, at step 16. Otherwise, the UE picks the one HARQ process, at step 18. After step 16 or step 18, the UE transmits data on the chosen HARQ process ID, at step 20.

However, returning to step 12, if the UE determines that there are no HARQ process IDs for retransmission, then the method proceeds to step 22, and the UE picks a process ID from non-overlapping pools. The UE then transmits the data on the chosen HARQ process ID, at step 20.

Figure 2:
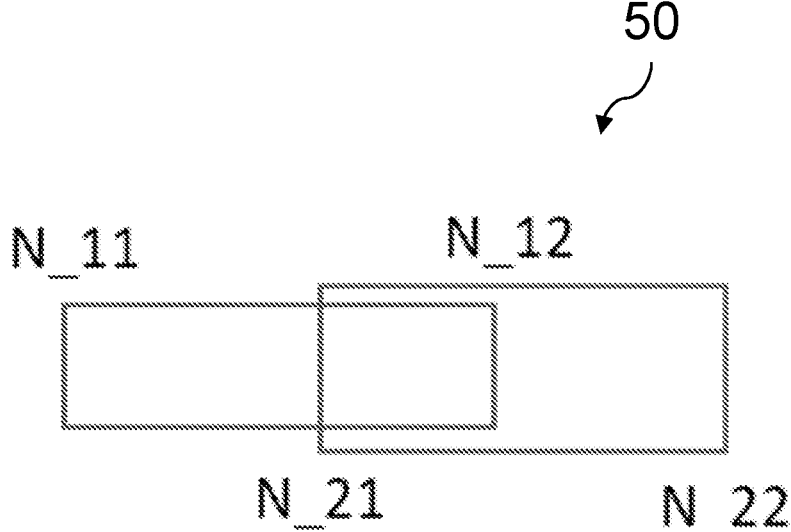
FIG. 2 illustrates a more detailed example of overlapping HARQ process pools, according to a particular embodiment.

FIG. 2 illustrates a more detailed example 50 of overlapping HARQ process pools, according to a particular embodiment. Suppose that the CG1 is configured with a HARQ process pool, numbered from N_11 to N_12 and CG2 is configured with a HARQ process pool, numbered from N_21 to N_22. There is an overlap if N_12>=N_21, as shown in FIG. 2.

The UE implementation chooses HARQ process between N_21 and N_12 if there is a retransmission among any HARQ process in this range (even though there can be other retransmission grants in other ranges). Otherwise, UE chooses the range N_11 to N_21 for CG1 and N_12 to N_22 for CG2. This improves the situation for subsequent prioritization decisions between configured grants. For example, in the non-overlapping HARQ processes, it is more likely that there are no ongoing retransmission that potentially block those HARQ IDs to be used for new transmissions (of higher priority data).

The method described above with regard to FIG. 1 is a simplified example in that the UE can always choose one in the non-overlapping or overlapping pool. In a follow-up example, for CG1, if there is no HARQ process for retransmission and it is not possible to choose a HARQ process ID from non-overlapping pools, the UE must choose a HARQ process ID in the overlapping pool. The UE implementation, for CG2, should avoid picking the same HARQ process ID within the overlapping pool, e.g., by choosing another HARQ process ID for retransmission in the overlapping pool if there are more than one in the overlapping pool or choosing another HARQ process ID for retransmission in the non-overlapping pool. The basic principle is the same: the UE avoids picking the same HARQ process ID for overlapping configured grants, while keeping the HARQ process ID in the overlapped HARQ process ID pool free from initial transmission (i.e., retransmission in the overlapped HARQ process ID pool is prioritized).

The examples above are simply one UE implementation example demonstrating how a UE may avoid using the same HARQ process for two overlapping configured grant resources. This can be implemented in the specification by one normative text as follows.

> For configured UL grants configured with cg-RetransmissionTimer, the UE implementation selects a HARQ Process ID among the HARQ process IDs available for the configured grant configuration. The UE shall prioritize retransmissions before initial transmissions. The UE shall toggle the new data indication (NDI) in the CG-UCI for new transmissions and not toggle the NDI in the CG-UCI in retransmissions. If the MAC entity is configured with lch-basedPrioritization, the UE implementation shall avoid selecting the same HARQ process ID for overlapping configured grants.

There may be cases in which a UE cannot avoid choosing the same HARQ process for the two overlapping configured grants. For example, all the HARQ processes between N_11 and N_21 in CG1 have their CG-RetransmissionTimer and CG-TransmissionTimer running and CG1 can only choose a HARQ process ID in the pool between N_21 and N_12 (with a size of one). CG2, on the other hand, has this only one HARQ process for retransmission. In this case, the retransmission is prioritized over initial transmission. This follows the principle in NR-U. This can be implemented in the specification by one normative text as follows.

> For configured UL grants configured with cg-RetransmissionTimer, the UE implementation selects a HARQ Process ID among the HARQ process IDs available for the configured grant configuration, in a particular embodiment. The UE shall prioritize retransmissions before initial transmissions. The UE shall toggle the NDI in the CG-UCI for new transmissions and not toggle the NDI in the CG-UCI in retransmissions. If the MAC entity is configured with lch-basedPrioritization, the UE implementation shall avoid selecting the same HARQ process ID for overlapping configured grants. If only the same HARQ process ID for overlapping configured grants can be chosen, the UE shall keep the grant for retransmission and discard the grant for initial transmission.

If both configured grants have the same transport block size (TBS) allocation, both grants would be chosen for retransmission, but because the retransmission data is the same (hence the priority is the same), the UE chooses by its implementation which grant to use (free choice). If configured grants have different TBS allocation, one configured grant cannot choose this for retransmission and can only accommodate an initial transmission. Thus, only one grant is chosen. In both cases, the end result is that there are not two overlapping grants with the same HARQ process to perform LCH-based grant prioritization. This results from the embodiment described above where, in the case of limited HARQ processes available to choose from, for HARQ processes that are usable in both configured grants, retransmission is chosen instead of transmission of new data. The network can ensure that new transmissions (of higher priority data) are chosen by configuring an appropriate number of non-shared HARQ processes for each configured grant configuration.

In a second group of embodiments, the LCH-based decision is considered more important than the retransmission decision because, following the principle that different priority data is transmitted on different configured grants, particular embodiments prioritize the higher priority data and its corresponding grant.

According to some embodiments, this only applies to shared HARQ processes of the overlapping configured grants and when no other HARQ processes are available for new transmissions. Within each configured grant's HARQ process pool, the UE may prioritize retransmissions before new transmissions, which may result in choosing the same HARQ process ID for both configured grants. Thereafter, LCH-based prioritization is applied to prioritize among configured grants for this same HARQ process according to the LCH-based priority of the data to be transmitted or retransmitted. When new transmission is prioritized over retransmission, the retransmission HARQ process needs to be flushed/reset, which according to one embodiment involves stopping of configured grant timer and cg-RetransmissionTimer, to ensure the correct handling of the new data, i.e. giving the new data the correct amount of time for potential later retransmission (after cgRetransmissionTimer expired until configured grant timer expired).

In some embodiments, when all HARQ processes are undergoing retransmissions for overlapping grants, the UE chooses the configured grant with the retransmission that includes the highest priority LCH data, i.e. applies LCH-based prioritization among the retransmissions. In this case, the priority of an UL grant for which the retransmission data is not associated with any logical channel (e.g., the retransmission of a MAC CE) is lower than the priority of an UL grant for which the retransmission data is associated with any logical channel.

In some embodiments, to reduce the case in which the same HARQ process is chosen for the two configured grants configurations (one for retransmission and one for initial transmission) and leads to a flush of the HARQ buffer of the grant for retransmission, the UE shall avoid selecting the same HARQ process ID for overlapping grants.

Figure 3:
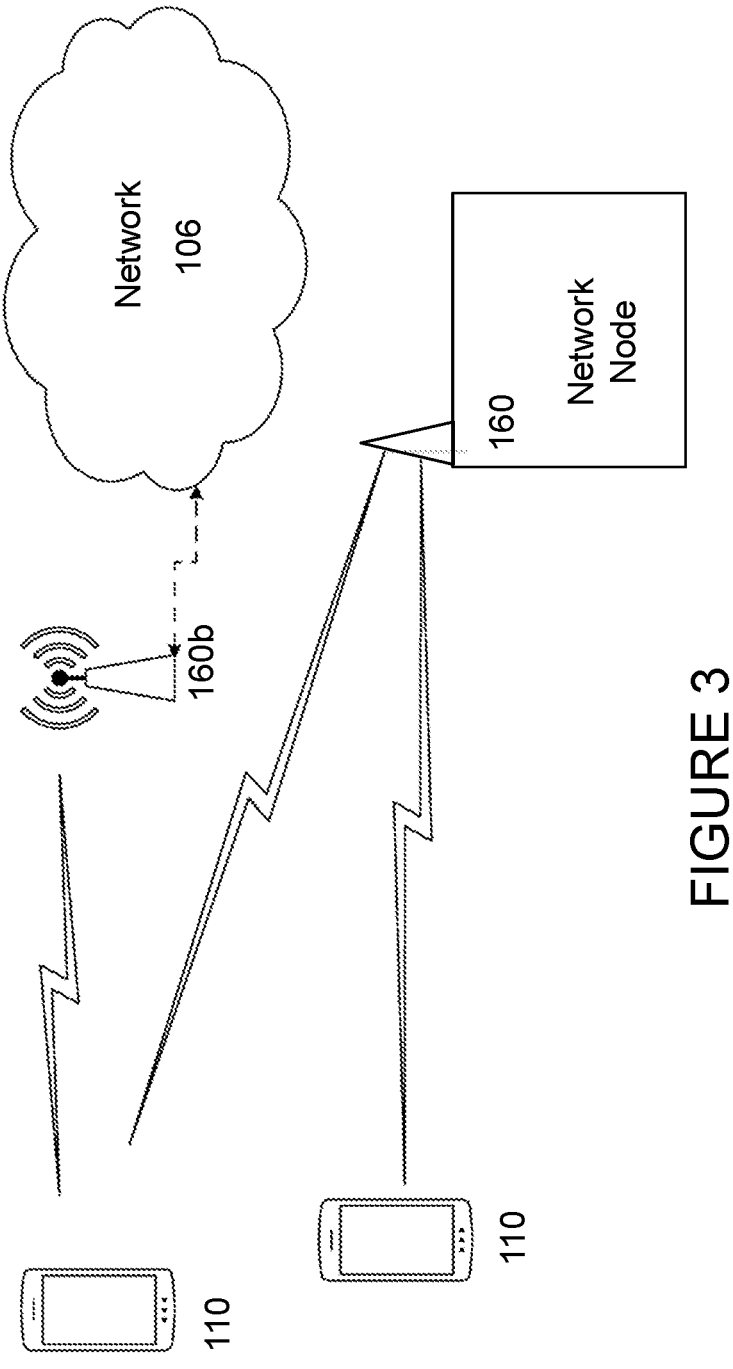
FIG. 3 illustrates an example wireless network, according to certain embodiments.

FIG. 3 illustrates an example wireless network in accordance with some embodiments. Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160*b*, and WDs 110. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 4:
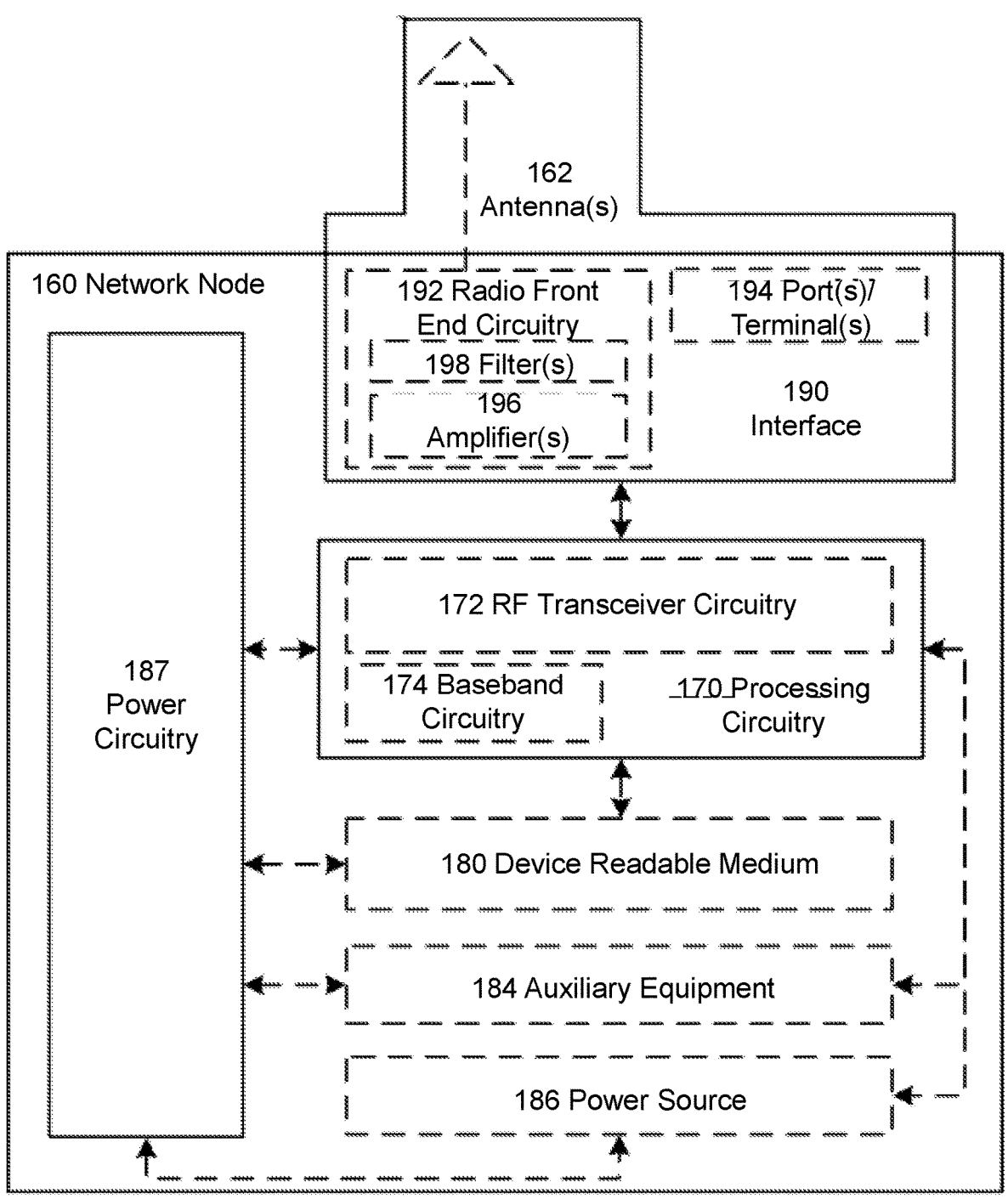
FIG. 4 illustrates an example network node, according to certain embodiments.

FIG. 4 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 5:
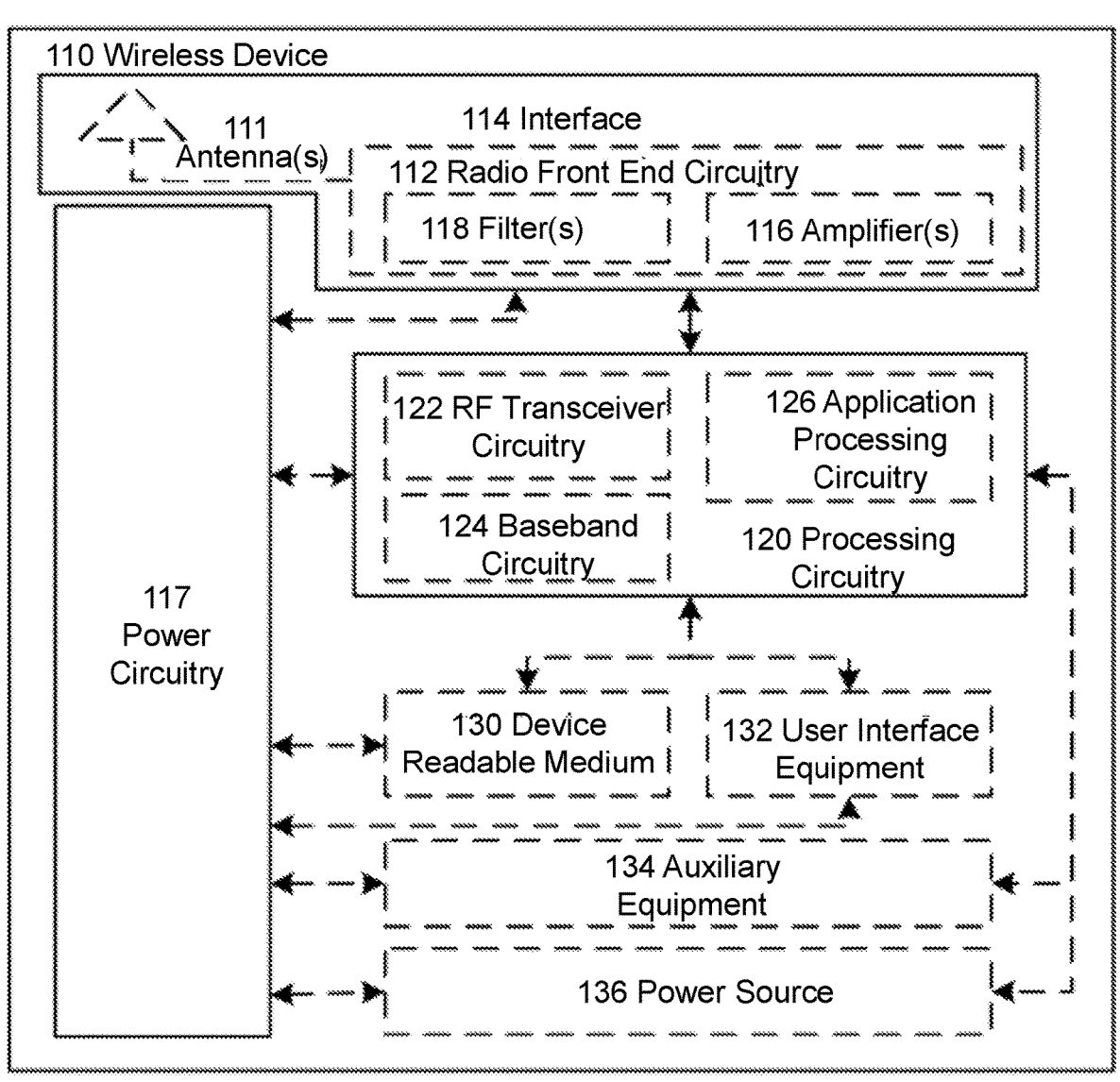
FIG. 5 illustrates an example wireless device, according to certain embodiments.

FIG. 5 illustrates an example wireless device 110, according to certain embodiments. As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 5, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated in FIG. 5, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 6:
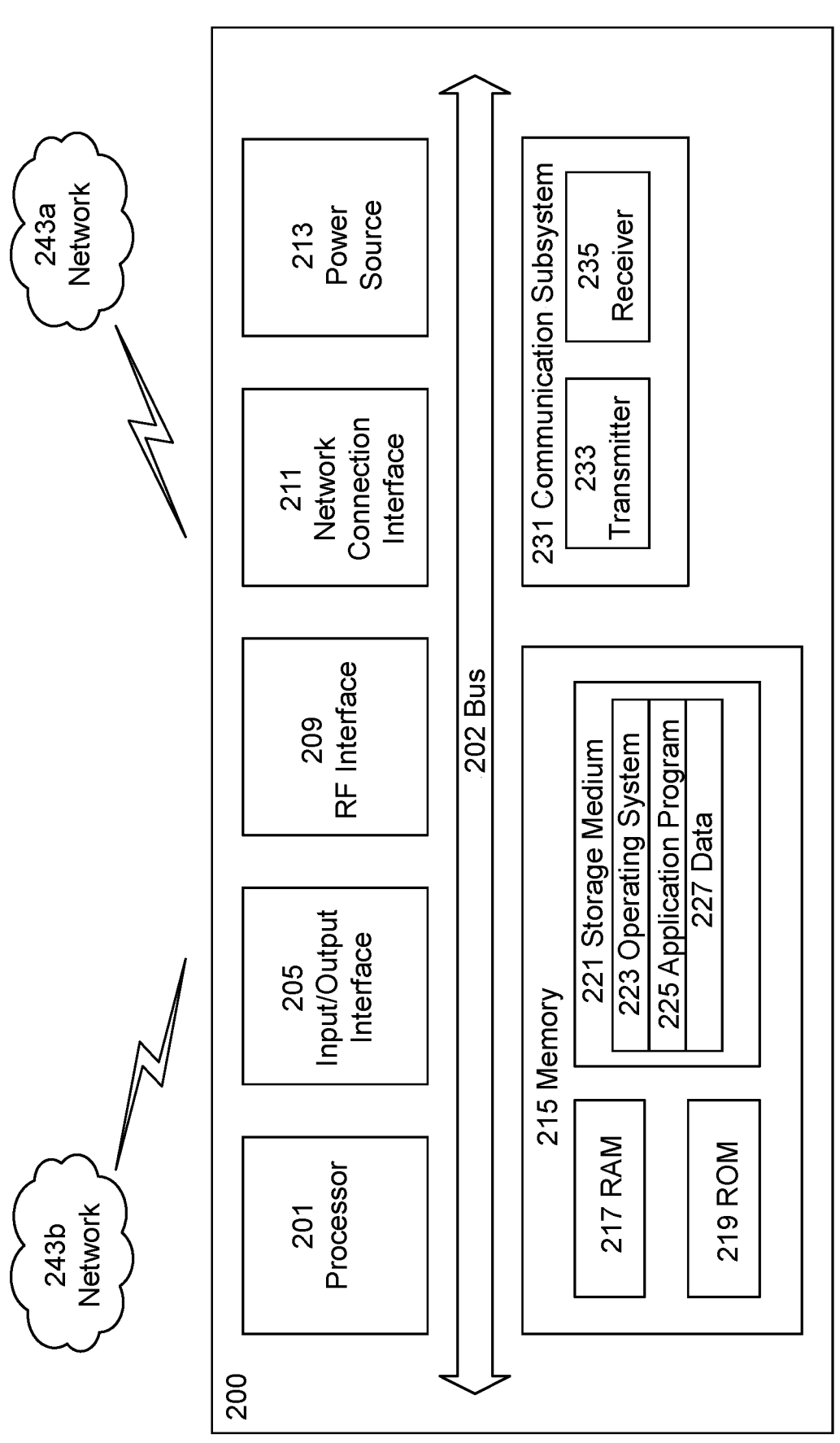
FIG. 6 illustrate an example user equipment, according to certain embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 6, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 6, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 7:
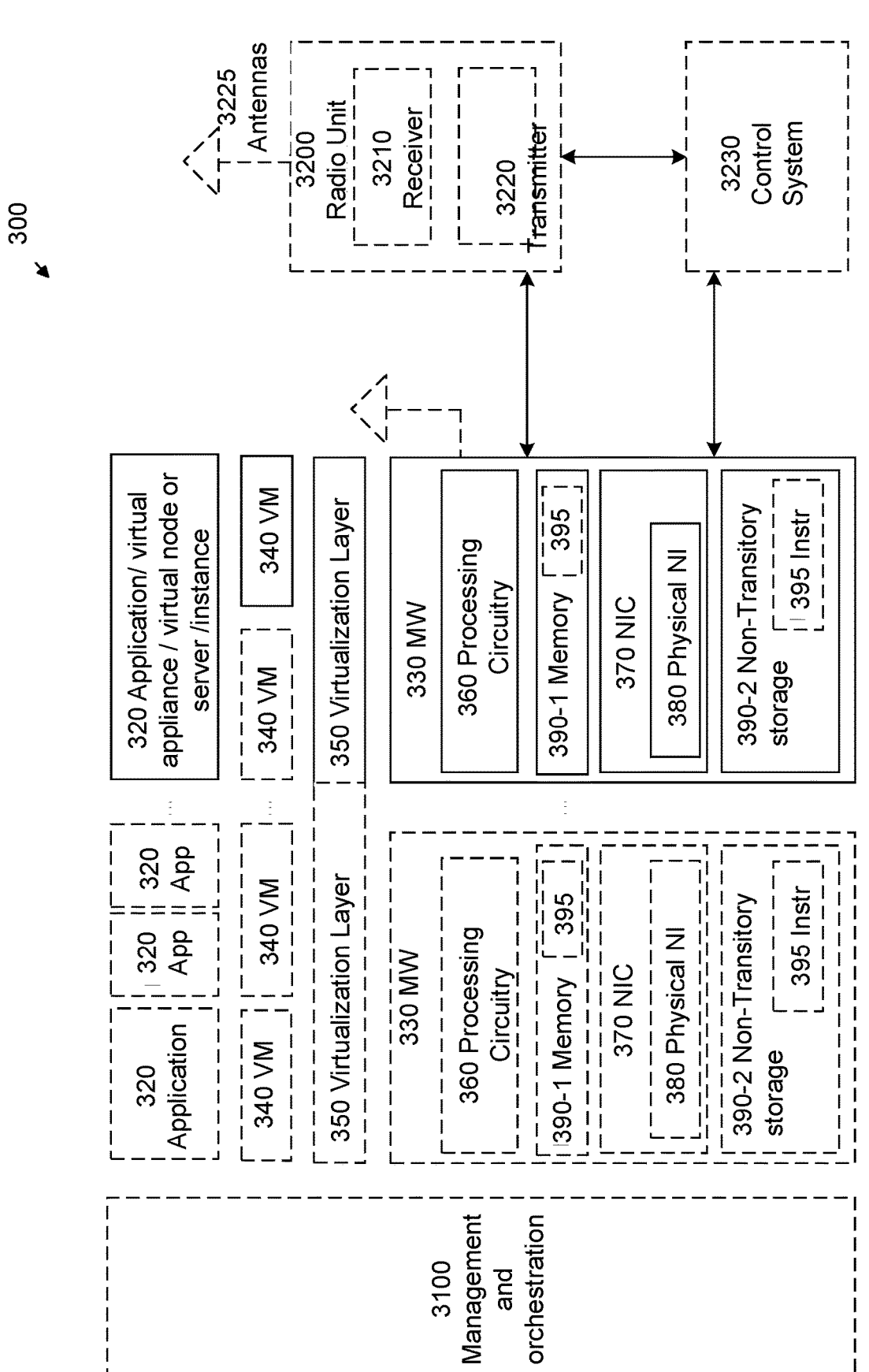
FIG. 7 illustrates a virtualization environment in which functions implemented by some embodiments may be virtualized, according to certain embodiments.

FIG. 7 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 7.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 8:
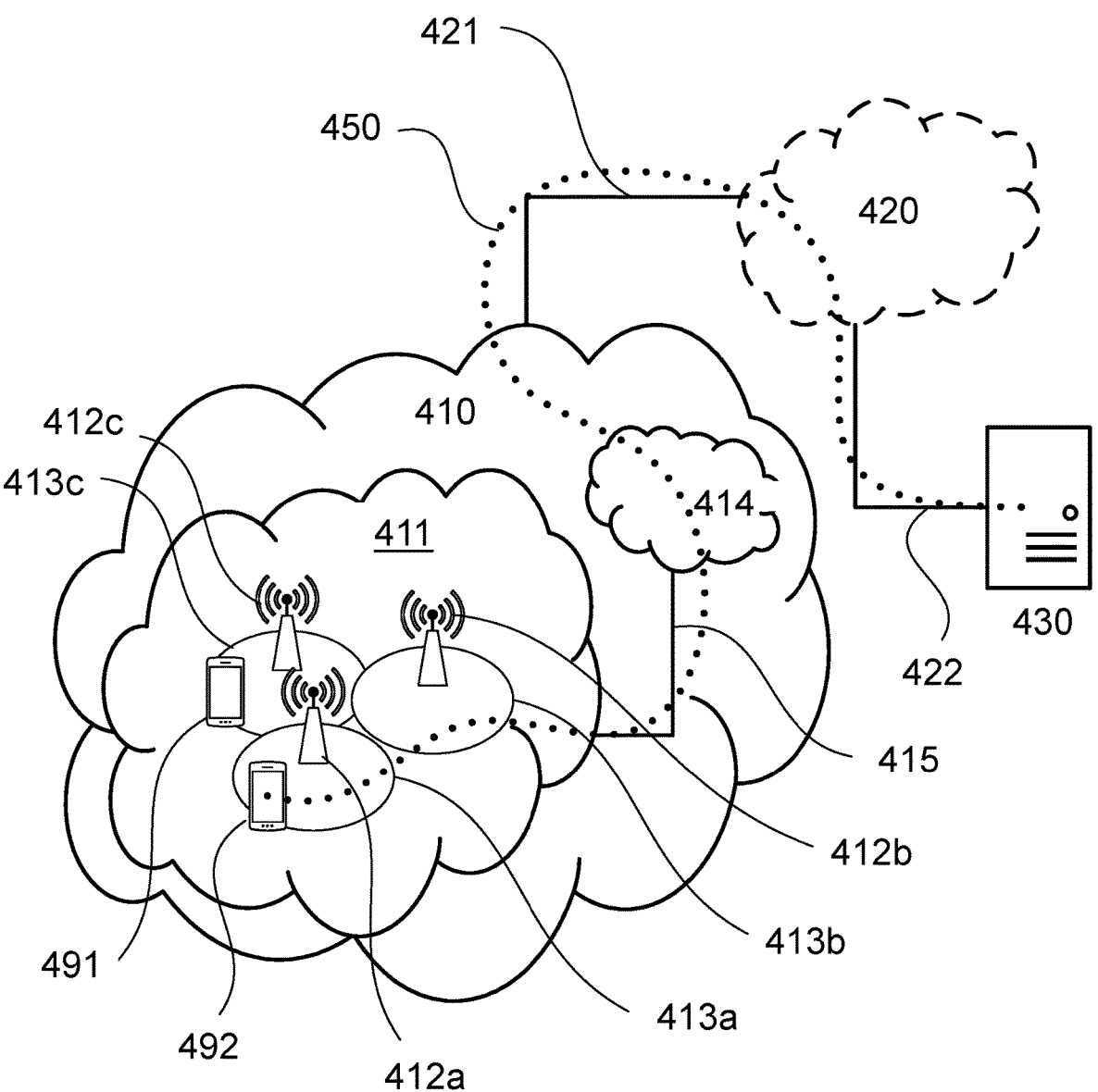
FIG. 8 illustrates a telecommunication network connected via an intermediate network to a host computer, according to certain embodiments.

FIG. 8 illustrates an example telecommunication network connected via an intermediate network to a host computer in accordance with some embodiments.

With reference to FIG. 8, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NB s, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of UL and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing UL communication originating from the UE 491 towards the host computer 430.

Example implementations, in accordance with an embodiment, of the UE, base station and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by base station 520. Communication interface 526 may be configured to facilitate connection 560 to host computer 510. Connection 560 may be direct or it may pass through a core network (not shown in FIG. 9) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 9:
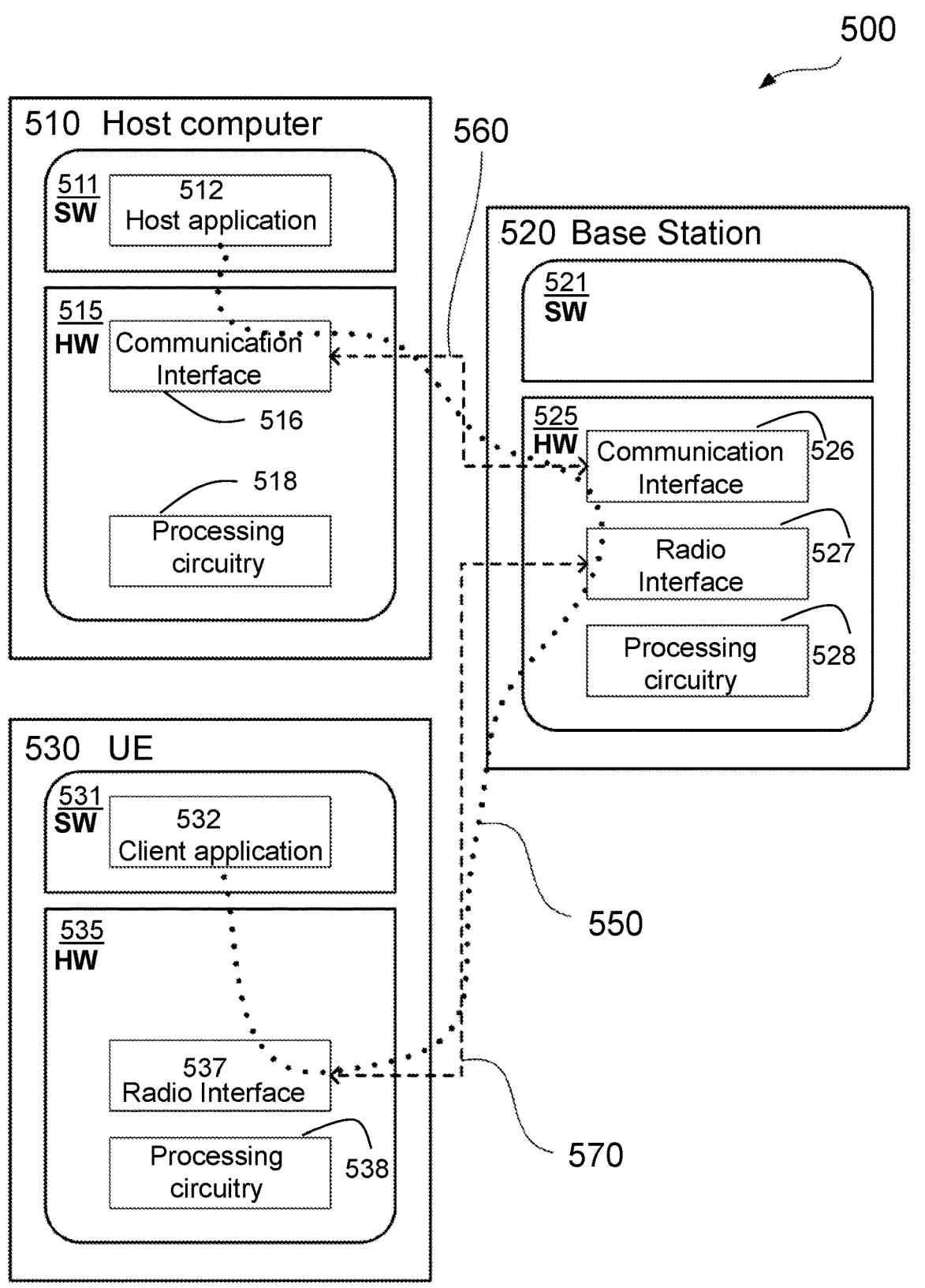
FIG. 9 illustrates a generalized block diagram of a host computer communicating via a base station with a user equipment over a partially wireless connection, according to certain embodiments.

It is noted that host computer 510, base station 520 and UE 530 illustrated in FIG. 9 may be similar or identical to host computer 430, one of base stations 412a, 412b, 412c and one of UEs 491, 492 of FIG. 8, respectively. This is to say, the inner workings of these entities may be as shown in FIG. 9 and independently, the surrounding network topology may be that of FIG. 8.

In FIG. 9, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 10, 11:
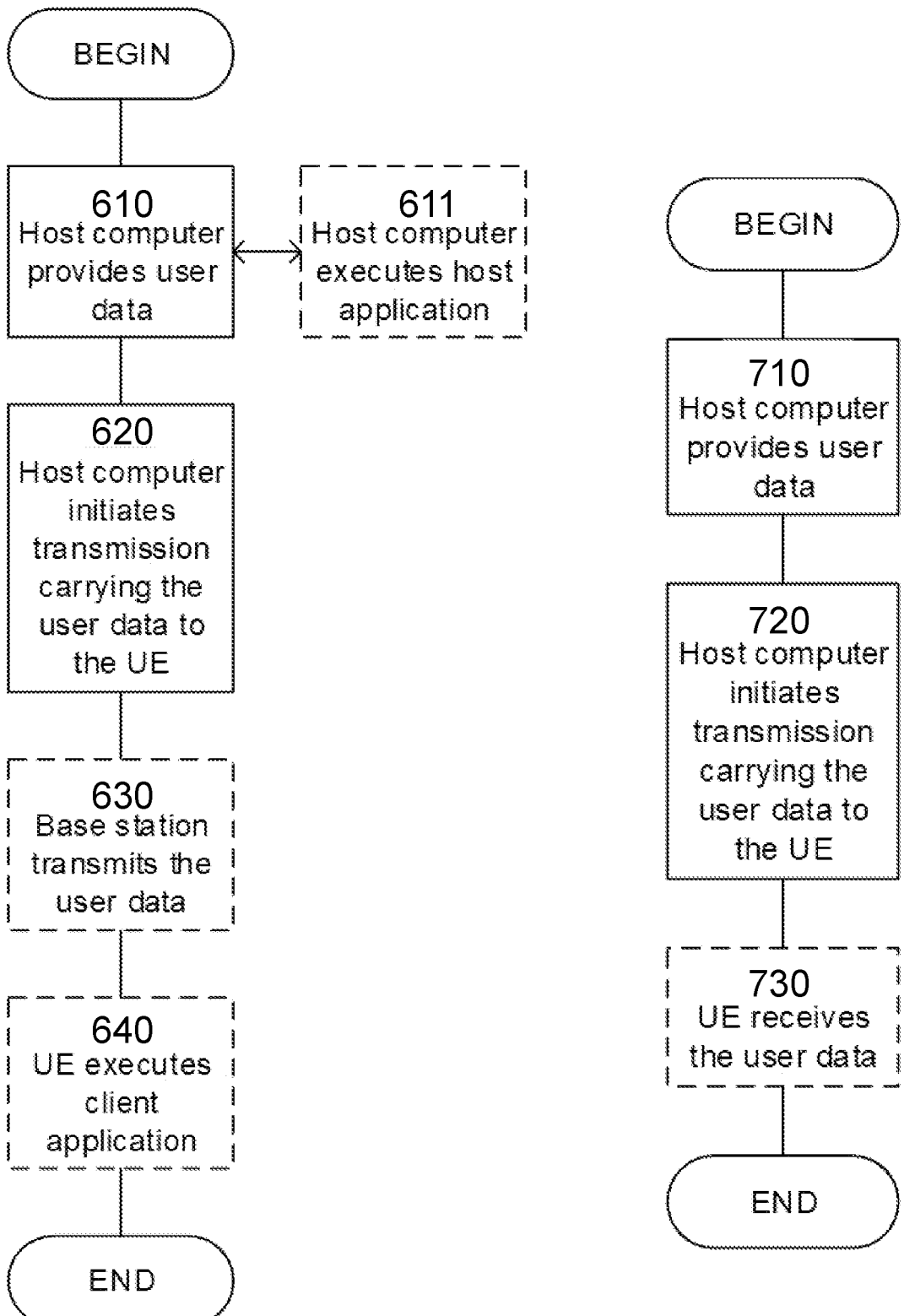
FIG. 10 illustrates a method implemented in a communication system, according to one embodiment.
FIG. 11 illustrates another method implemented in a communication system, according to one embodiment.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 12, 13:
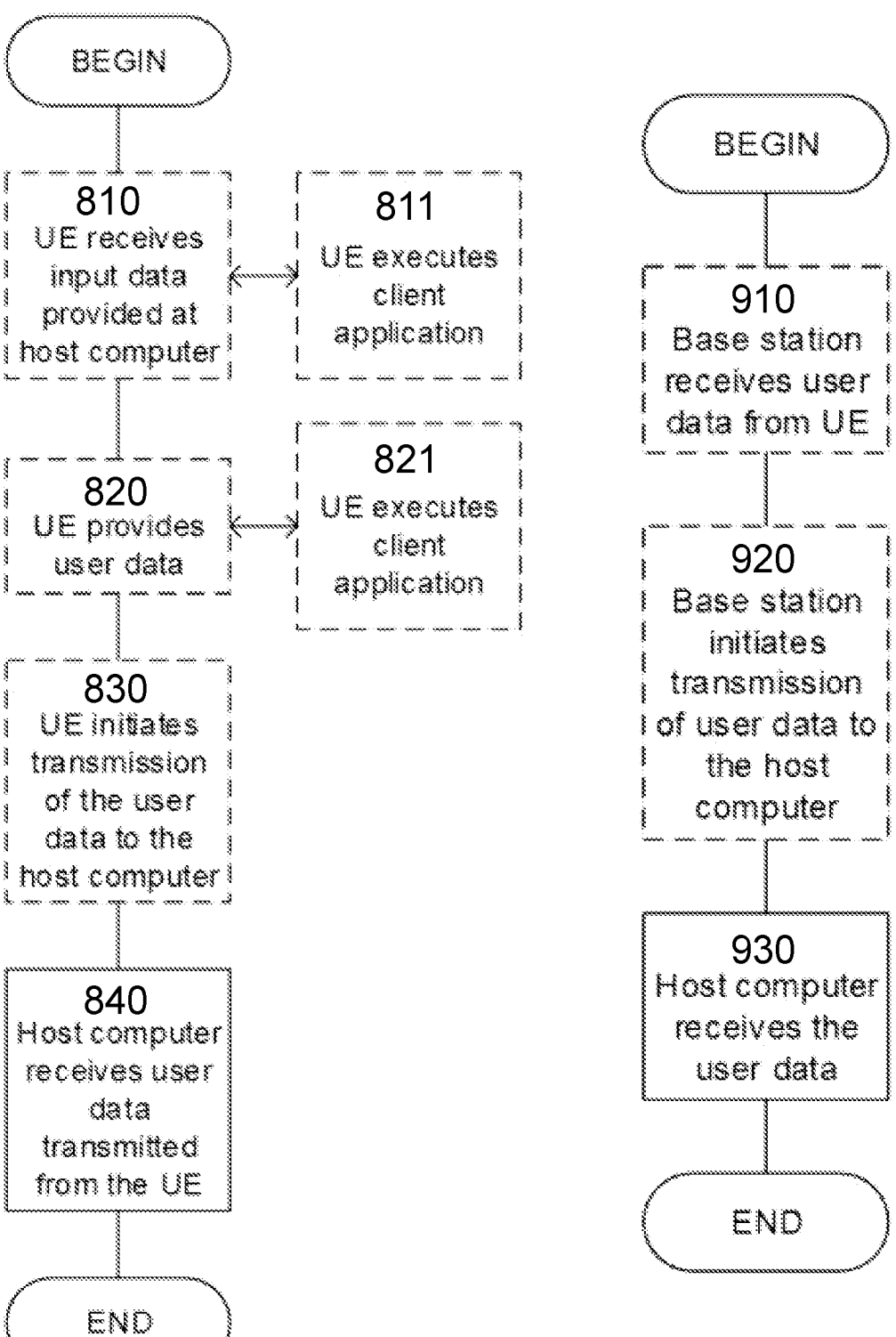
FIG. 12 illustrates another method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 14:
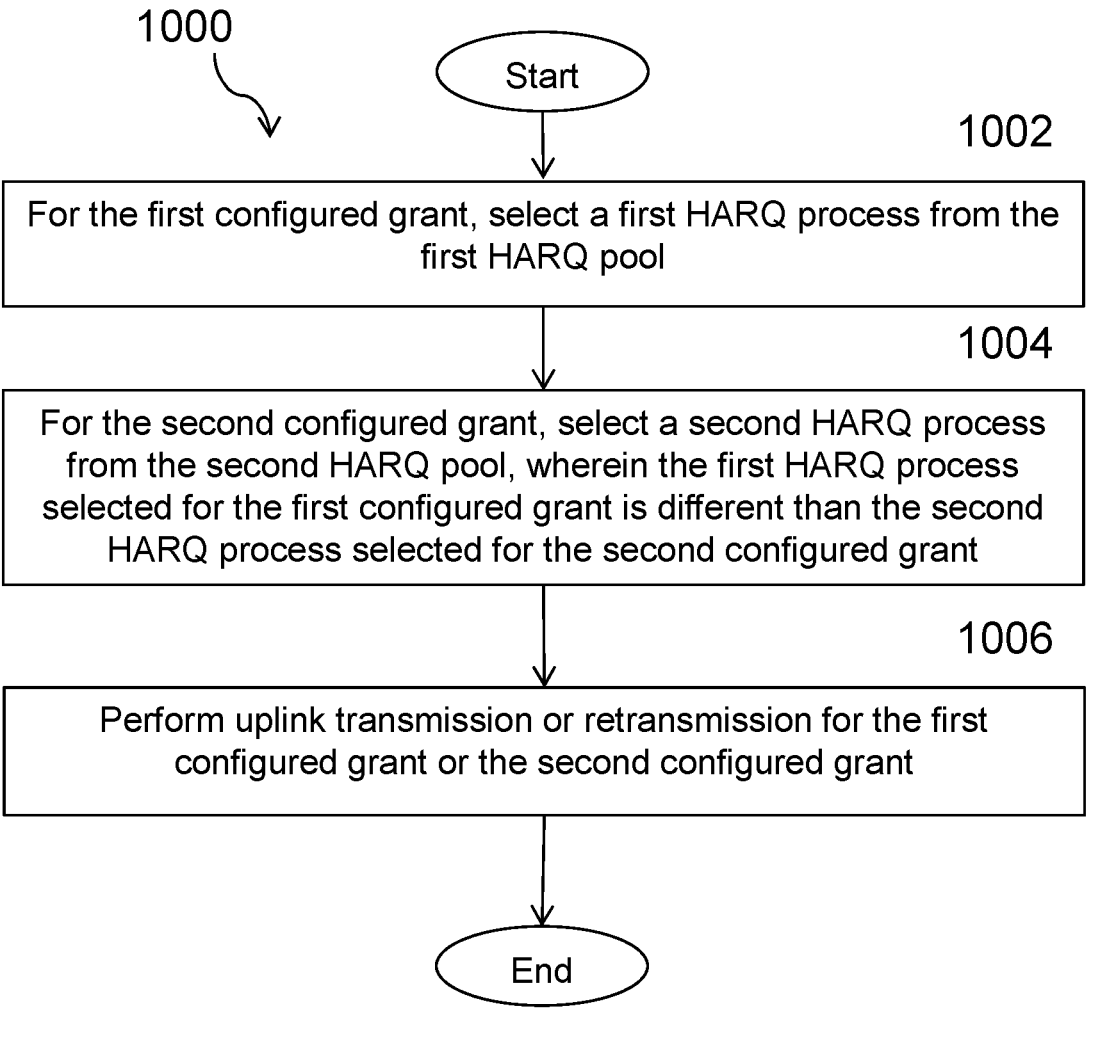
FIG. 14 illustrates an example method by a wireless device, according to certain embodiments.

FIG. 14 illustrates an example method 1000 performed by a wireless device 110, according to certain embodiments. In the illustrated method, the wireless device 110 is configured with a first configured grant (CG1) associated with a first HARQ pool and a second configured grant (CG2) associated with a second HARQ pool. The first HARQ pool at least partially overlaps with the second HARQ pool, and the second configured grant partially overlaps with the first configured grant.

At step 1002, the wireless device 110 selects, a first HARQ process from the first HARQ pool for the first configured grant. At step 1004, the UE selects a second HARQ process from the second HARQ pool for the second configured grant. The first HARQ process selected for the first configured grant is different than the second HARQ process selected for the second configured grant. The wireless device 110 performs UL transmission or retransmission for the first configured grant or the second configured grant, at step 1006.

In a particular embodiment, when selecting the first HARQ process for the first configured grant and the second HARQ process for the second configured grant, the wireless device 110 determines whether there is a retransmission among any of the HARQ processes in an overlapping portion of the first and second HARQ pools. When there is the retransmission among any of the HARQ processes in the overlapping portion of the first and second HARQ pools, a selected HARQ process is for the retransmission and is from the overlapping portion of the first and second HARQ pools. Conversely, when there is no retransmission among any of the HARQ processes in the overlapping portion of the first and second HARQ pools, the first HARQ process for the first configured grant and the second HARQ process for the second configured grant are from the non-overlapping portion of the first and second HARQ pools.

In a particular embodiment, when determining there is a retransmission among all of the HARQ processes in the overlapping portion of the first and second HARQ pools, the wireless device 110 flushes a HARQ process with a lower priority retransmission data and uses the HARQ process for a new transmission of higher priority data.

In a particular embodiment, the first HARQ process is for retransmission of data according to the first configured grant, and the second HARQ process is for initial transmission of data according to the second configured grant. In this scenario, the wireless device 110 prioritizes the retransmission of data according to the first configured grant over the initial transmission of data according to the second configured grant, in a particular embodiment.

In a particular embodiment, the first HARQ process is for transmission or retransmission of high priority logical channel data according to the first configured grant, and the second HARQ process is for transmission or retransmission of low priority logical channel data according to the second configured grant. In this scenario, the wireless device 110 prioritizes the transmission or retransmission of the high priority logical channel data according to the first configured grant over the transmission or retransmission of low priority logical channel data according to the second configured grant, in a particular embodiment.

In a particular embodiment, when selecting the first HARQ process, the wireless device 110 selects a first HARQ process identifier. Likewise, when selecting the second HARQ process, the wireless device 110 selects a second HARQ process identifier.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

Group A Embodiments

Example Embodiment 1. A method performed by a wireless device, wherein the wireless device is configured with a first configured grant associated with a first hybrid automatic repeat request (HARQ) pool and a second configured grant associated with a second HARQ pool and first HARQ pool at least partially overlaps with the second HARQ pool, the method comprising: selecting a HARQ process from the first HARQ pool or the second HARQ pool wherein a HARQ process selected for the first configured grant is different than a HARQ process selected for the second configured grant; and performing UL transmission for the selected HARQ process.

Example Embodiment 2. The method of the previous embodiment, further comprising: when determining there is a retransmission among any of the HARQ processes in the overlapping portion of the first and second HARQ pools, the wireless device selects a HARQ process from the overlapping portion of the first and second HARQ pools; otherwise, for the first configured grant the wireless device selects a HARQ process from the non-overlapping portion of the first HARQ pool and for the second configured grant the wireless device selects a HARQ process from the non-overlapping portion of the second HARQ pool.

Example Embodiment 3. The method of the previous embodiments, further comprising: when the wireless device is not able to select a HARQ process from the first HARQ pool or the second HARQ pool wherein a HARQ process selected for the first configured grant is different than a HARQ process selected for the second configured grant, then the wireless device uses one of the first or second configured grants for retransmission and discards one of the first or second configured grants for initial transmission.

Example Embodiment 4. The method of the previous embodiments, further comprising: when determining there is a retransmission among all of the HARQ processes in the overlapping portion of the first and second HARQ pools, the wireless device flushes a HARQ process with lower priority retransmission data and uses it for a new transmission of higher priority data.

Example Embodiment 5. A method performed by a wireless device, the method comprising: any of the wireless device steps, features, or functions described above, either alone or in combination with other steps, features, or functions described above.

Example Embodiment 6. The method of the previous embodiments, further comprising one or more additional wireless device steps, features or functions described above.

Example Embodiment 7. The method of any of the previous embodiments, further comprising: providing user data; and forwarding the user data to a host computer via the transmission to the base station.

Group B Embodiments

Example Embodiment 8. A method performed by a base station, the method comprising: any of the base station steps, features, or functions described above, either alone or in combination with other steps, features, or functions described above.

Example Embodiment 9. The method of the previous embodiment, further comprising one or more additional base station steps, features or functions described above.

Example Embodiment 10. The method of any of the previous embodiments, further comprising: obtaining user data; and forwarding the user data to a host computer or a wireless device.

Group C Embodiments

Example Embodiment 11. A wireless device comprising: processing circuitry configured to perform any of the steps of any of the Group A embodiments; and power supply circuitry configured to supply power to the wireless device.

Example Embodiment 12. A base station comprising: processing circuitry configured to perform any of the steps of any of the Group B embodiments; power supply circuitry configured to supply power to the wireless device.

Example Embodiment 13. A user equipment (UE) comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment 14. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

Example Embodiment 15. The communication system of the pervious embodiment further including the base station.

Example Embodiment 16. The communication system of the previous 2 embodiments, further including the UE, wherein the UE is configured to communicate with the base station.

Example Embodiment 17. The communication system of the previous 3 embodiments, wherein: the processing circuitry of the host computer is configured to execute a host application, thereby providing the user data; and the UE comprises processing circuitry configured to execute a client application associated with the host application.

Example Embodiment 18. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B embodiments.

Example Embodiment 19. The method of the previous embodiment, further comprising, at the base station, transmitting the user data.

Example Embodiment 20. The method of the previous 2 embodiments, wherein the user data is provided at the host computer by executing a host application, the method further comprising, at the UE, executing a client application associated with the host application.

Example Embodiment 21. A user equipment (UE) configured to communicate with a base station, the UE comprising a radio interface and processing circuitry configured to performs any of the previous 3 embodiments.

Example Embodiment 22. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

Example Embodiment 23. The communication system of the previous embodiment, wherein the cellular network further includes a base station configured to communicate with the UE.

Example Embodiment 24. The communication system of the previous 2 embodiments, wherein: the processing circuitry of the host computer is configured to execute a host application, thereby providing the user data; and the UE's processing circuitry is configured to execute a client application associated with the host application.

Example Embodiment 25. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A embodiments.

Example Embodiment 26. The method of the previous embodiment, further comprising at the UE, receiving the user data from the base station.

Example Embodiment 27. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A embodiments.

Example Embodiment 28. The communication system of the previous embodiment, further including the UE.

Example Embodiment 29. The communication system of the previous 2 embodiments, further including the base station, wherein the base station comprises a radio interface configured to communicate with the UE and a communication interface configured to forward to the host computer the user data carried by a transmission from the UE to the base station.

Example Embodiment 30. The communication system of the previous 3 embodiments, wherein: the processing circuitry of the host computer is configured to execute a host application; and the UE's processing circuitry is configured to execute a client application associated with the host application, thereby providing the user data.

Example Embodiment 31. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Example Embodiment 32. A method implemented in a communication system including a host computer, a base station and a user equipment (UE), the method comprising: at the host computer, receiving user data transmitted to the base station from the UE, wherein the UE performs any of the steps of any of the Group A embodiments.

Example Embodiment 33. The method of the previous embodiment, further comprising, at the UE, providing the user data to the base station.

Example Embodiment 34. The method of the previous 2 embodiments, further comprising: at the UE, executing a client application, thereby providing the user data to be transmitted; and at the host computer, executing a host application associated with the client application.

Example Embodiment 35. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Example Embodiment 36. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

Example Embodiment 37. The communication system of the previous embodiment further including the base station.

Example Embodiment 38. The communication system of the previous 2 embodiments, further including the UE, wherein the UE is configured to communicate with the base station.

Example Embodiment 39. The communication system of the previous 3 embodiments, wherein: the processing circuitry of the host computer is configured to execute a host application; the UE is configured to execute a client application associated with the host application, thereby providing the user data to be received by the host computer.

Example Embodiment 40. A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A embodiments.

Example Embodiment 41. The method of the previous embodiment, further comprising at the base station, receiving the user data from the UE.

Example Embodiment 42. The method of the previous 2 embodiments, further comprising at the base station, initiating a transmission of the received user data to the host computer.

The invention claimed is:

1. A method performed by a wireless device, wherein the wireless device is configured with a first configured grant associated with a first hybrid automatic repeat request (HARQ) pool and a second configured grant associated with a second HARQ pool, and wherein the first HARQ pool at least partially overlaps with the second HARQ pool, and wherein the second configured grant partially overlaps with the first configured grant, the method comprising:

for the first configured grant, selecting a first HARQ process from the first HARQ pool, for the second configured grant, selecting a second HARQ process from the second HARQ pool, wherein the first HARQ process selected for the first configured grant is different than the second HARQ process selected for the second configured grant; and transmitting on an uplink (UL) for the first configured grant or the second configured grant, and wherein when selecting the first HARQ process for the first configured grant and the second HARQ process for the second configured grant, the method further comprises:

determining whether there is a retransmission in an overlapping portion of the first HARQ pool and the second HARQ pool, wherein, when there is the retransmission in the overlapping portion of the first HARQ pool and the second HARQ pool, a selected HARQ process is for the retransmission and is from the overlapping portion of the first HARQ pool and the second HARQ pool, and wherein, when there is no retransmission in the overlapping portion of the first HARQ pool and the second HARQ pool, the first HARQ process for the first configured grant and the second HARQ process for the second configured grant are from a non-overlapping of the first HARQ pool and the second HARQ pool.

2. The method of claim 1, further comprising:

when determining there is the retransmission in the overlapping portion of the first HARQ pool and the second HARQ pool, the wireless device flushes a HARQ process with a lower priority retransmission data and uses the HARQ process for a new transmission of higher priority data.

3. The method of claim 1, wherein the first HARQ process is for retransmission of data according to the first configured grant, wherein the second HARQ process is for initial transmission of data according to the second configured grant, and the method further comprises:

prioritizing the retransmission of data according to the first configured grant over the initial transmission of data according to the second configured grant.

4. The method of claim 1, wherein the first HARQ process is for transmitting or retransmitting high priority logical channel data according to the first configured grant, wherein the second HARQ process is for transmitting or retransmitting low priority logical channel data according to the second configured grant, and the method further comprises:

prioritizing transmitting or retransmitting the high priority logical channel data according to the first configured grant over transmitting or retransmitting the low priority logical channel data according to the second configured grant.

5. The method of claim 1, wherein selecting the first HARQ process comprises selecting a first HARQ process identifier and wherein selecting the second HARQ process comprises selecting a second HARQ process identifier.

6. A wireless device configured with a first configured grant associated with a first hybrid automatic repeat request (HARQ) pool and a second configured grant associated with a second HARQ pool, wherein the first HARQ pool at least partially overlaps with the second HARQ pool, wherein the second configured grant partially overlaps with the first configured grant, the wireless device comprising:

a memory storing instructions; and a processor operable to execute the instructions to cause the wireless device to:

for the first configured grant, select a first HARQ process from the first HARQ pool, for the second configured grant, select a second HARQ process from the second HARQ pool, wherein the first HARQ process selected for the first configured grant is different than the second HARQ process selected for the second configured grant; and transmit on an uplink (UL) for the first configured grant or the second configured grant, and wherein when selecting the first HARQ process for the first configured grant and the second HARQ process for the second configured grant, the wireless device is operable to:

determine whether there is a retransmission in an overlapping portion of the first HARQ pool and the second HARQ pool, wherein, when there is the retransmission in the overlapping portion of the first HARQ pool and the second HARQ pool, a selected HARQ process is for the retransmission and is from the overlapping portion of the first HARQ pool and the second HARQ pool, and wherein, when there is no retransmission in the overlapping portion of the first HARQ pool and the second HARQ pool, the first HARQ process for the first configured grant and the second HARQ process for the second configured grant are from a non-overlapping of the first HARQ pool and the second HARQ pool.

7. The wireless device of claim 6, adapted to:

when determining there is the retransmission in the overlapping portion of the first HARQ pool and the second HARQ pool, flushing a HARQ process with a lower priority retransmission data and using the HARQ process for a new transmission of higher priority data.

8. The wireless device of claim 6, wherein the first HARQ process is for retransmission of data according to the first configured grant, wherein the second HARQ process is for initial transmission of data according to the second configured grant, and the wireless device is adapted to prioritize the retransmission of data according to the first configured grant over the initial transmission of data according to the second configured grant.

9. The wireless device of claim 6, wherein the first HARQ process is for transmitting or retransmitting high priority logical channel data according to the first configured grant, wherein the second HARQ process is for transmitting or retransmitting of low priority logical channel data according to the second configured grant, and the wireless device is adapted to prioritize transmitting or retransmitting the high priority logical channel data according to the first configured grant over transmitting or retransmitting the low priority logical channel data according to the second configured grant.

10. The wireless device of claim 6, wherein when selecting the first HARQ process the wireless device is adapted to select a first HARQ process identifier and wherein when selecting the second HARQ process the wireless device is adapted to select a second HARQ process identifier.

* * * * *